United States Patent
Lin et al.

(10) Patent No.: US 9,891,395 B2
(45) Date of Patent: Feb. 13, 2018

(54) OPTICAL TRANSMITTER OR TRANSCEIVER INCLUDING OPTICAL MULTIPLEXER WITH INPUT AND OUTPUT PORTS ON A SINGLE SIDE

(71) Applicant: Applied Optoelectronics, Inc., Sugar Land, TX (US)

(72) Inventors: Kai-Sheng Lin, Sugar Land, TX (US); Hsiu-Che Wang, Rosenberg, TX (US); Yong-Xuan Liang, Stafford, TX (US)

(73) Assignee: Applied Optoelectronics, Inc, Sugar Land, TX (US)

( * ) Notice: Subject to any disclaimer, the term of this patent is extended or adjusted under 35 U.S.C. 154(b) by 0 days.

(21) Appl. No.: 15/210,193

(22) Filed: Jul. 14, 2016

(65) Prior Publication Data

US 2018/0017745 A1    Jan. 18, 2018

(51) Int. Cl.
| | |
|---|---|
| *G02B 6/42* | (2006.01) |
| *H04B 10/572* | (2013.01) |
| *H04B 10/40* | (2013.01) |
| *G02B 6/12* | (2006.01) |
| *H04J 14/02* | (2006.01) |

(52) U.S. Cl.
CPC ....... *G02B 6/4246* (2013.01); *G02B 6/12016* (2013.01); *G02B 6/4249* (2013.01); *G02B 6/4262* (2013.01); *G02B 6/4292* (2013.01); *H04B 10/40* (2013.01); *H04B 10/572* (2013.01); *H04J 14/02* (2013.01)

(58) Field of Classification Search
None
See application file for complete search history.

(56) References Cited

U.S. PATENT DOCUMENTS

| | | | | |
|---|---|---|---|---|
| 7,275,959 | B2* | 10/2007 | Daly | H01R 23/6873 439/540.1 |
| 9,039,303 | B2* | 5/2015 | Wang | H04B 10/40 385/147 |
| 9,291,782 | B2* | 3/2016 | Skepnek | G02B 6/4201 |
| 9,590,737 | B2* | 3/2017 | Tang | G02B 6/4292 |
| 2007/0223552 | A1* | 9/2007 | Muendel | G02B 6/12004 372/50.12 |
| 2013/0001410 | A1* | 1/2013 | Zhao | H05K 1/0298 250/227.11 |
| 2017/0059394 | A1* | 3/2017 | Ho | G01J 1/0271 |
| 2017/0063464 | A1* | 3/2017 | Ho | G02B 6/3831 |

* cited by examiner

*Primary Examiner* — Tina Wong
(74) *Attorney, Agent, or Firm* — Grossman Tucker Perreault & Pfleger, PLLC; Norman S. Kinsella

(57) ABSTRACT

A multi-channel optical transmitter or transceiver includes an optical multiplexer with input and output ports on a single side. The optical multiplexer receives optical signals at different channel wavelengths on a plurality of mux input ports on one side and combines the optical signals into a multiplexed optical signal, which is output on an optical output port on the same side. The optical multiplexer may be located at a distal end of a transceiver or transmitter housing. In one embodiment, the optical multiplexer is a reversed planar lightwave circuit (PLC) splitter including splitter output ports that are used as the mux input ports and a splitter input port that is used as the mux output port. The mux input ports may be optically coupled to respective transmitter optical subassembly (TOSA) modules with optical fibers.

20 Claims, 6 Drawing Sheets

US 9,891,395 B2

OPTICAL TRANSMITTER OR TRANSCEIVER INCLUDING OPTICAL MULTIPLEXER WITH INPUT AND OUTPUT PORTS ON A SINGLE SIDE

TECHNICAL FIELD

The present disclosure relates to optical transmitters and transceivers, and more particularly, to an optical transmitter or transceiver including an optical multiplexer, such as an AWG or reversed planar lightwave circuit (PLC) splitter, with input and output ports on a single side.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, and manufacturing yield. Optical transceivers can include one or more transmitter optical subassemblies (TOSAs) and receiver optical subassemblies (ROSAs) for the purpose of transmitting and receiving optical signals. As channel density and increased speed becomes an increasingly important aspect of optical transceivers, the ability to scale-down while maintaining nominal transceiver performance raises numerous non-trivial challenges. Optical efficiency or power may be lost, for example, as a result of insertion loss and/or polarization dependent loss (PDL) caused by optical components in an optical transceiver. The heat generated by lasers in the TOSA(s) within a small space may also adversely affect performance of optical components, such as the optical multiplexer.

BRIEF DESCRIPTION OF THE DRAWINGS

These and other features and advantages will be better understood by reading the following detailed description, taken together with the drawings wherein.

DETAILED DESCRIPTION

Figure 1:
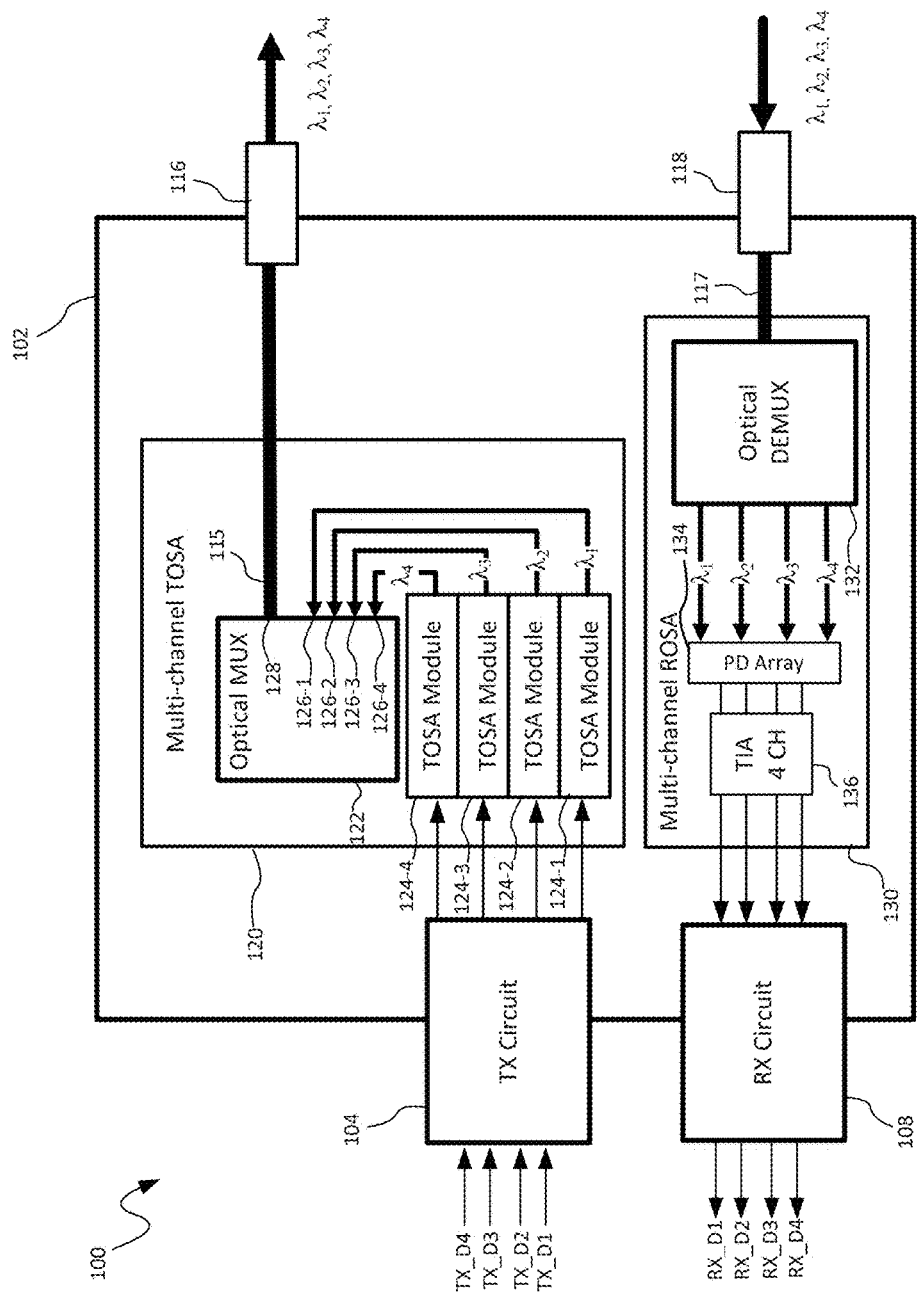
FIG. 1 is a schematic diagram of a multi-channel optical transceiver including a multi-channel transmitter optical sub-assembly (TOSA) and multi-channel receiver optical sub-assembly (ROSA), consistent with embodiments of the present disclosure.

A multi-channel optical transmitter or transceiver, consistent with the present disclosure, includes an optical multiplexer with input and output ports on a single side. The optical multiplexer receives optical signals at different channel wavelengths on a plurality of mux input ports on one side and combines the optical signals into a multiplexed optical signal, which is output on an optical output port on the same side. The optical multiplexer may be located at a distal end of a transceiver or transmitter housing. In one embodiment, the optical multiplexer is a reversed planar lightwave circuit (PLC) splitter including splitter output ports that are used as the mux input ports and a splitter input port that is used as the mux output port. The mux input ports may be optically coupled to respective transmitter optical subassembly (TOSA) modules with optical fibers. The PLC splitter includes wavelength independent branched waveguides that combine the optical signals received on the mux input ports into the multiplexed optical signal on the mux output port. The branched waveguides may be generally U-shaped such that the mux input ports and the mux output port are located on the same side.

Placing the mux input ports and output port on a single side of the optical multiplexer reduces the size of the optical multiplexer footprint and thus decreases the total length of the transceiver or transmitter. In optical multiplexers with mux input ports and a mux output port on opposite ends, optical fibers are coupled to the ports at the opposite ends of the optical multiplexer. Thus, separate fiber arrays and fiber coupling structures are used at each end and space must be provided for the optical fibers at each end and allowing for the desired bend radius of the optical fibers. Bending the optical fibers too much may result in loss and/or damage to the fibers. By eliminating the fiber coupling on one side, the footprint of the optical multiplexer and the length of the transceiver/transmitter is reduced.

With an optical multiplexer having mux input ports and a mux output port on opposite sides, the additional space required for the optical fibers coupled at the far end of the optical multiplexer makes it more challenging to locate the optical multiplexer at a distal end of the housing because space is needed to couple the optical fibers. Therefore, providing the mux input ports and mux output port on the same side of the optical multiplexer may facilitate smaller transmitters.

Using a PLC splitter as the optical multiplexer with the input ports and output port on the same side provides further advantages. Because the PLC splitter is wavelength independent (i.e., the waveguides do not correspond to a particular wavelength), the PLC splitter may be less susceptible to wavelength drift, for example, caused by temperature changes. In an arrayed waveguide grating (AWG), each of the waveguides is designed to pass a particular wavelength and thus the input ports are matched to lasers including those wavelengths when using the AWG for optical multiplexing.

As such, insertion loss is also wavelength dependent because changes in the laser wavelengths (i.e., drift) from the corresponding wavelengths of the AWG inputs will result in changes of insertion loss. The final output power of the AWG may thus vary with temperature and may vary differently for different channels. Also, the input ports of the AWG can only be connected to corresponding TOSA modules with the matching channel wavelengths. Although the PLC splitter may have higher insertion loss than an AWG, the insertion loss is less likely to vary with temperature and is more consistent across channels, thereby providing improved channel-to-channel power stability. Using the reversed PLC splitter instead of an AWG may also provide more connectivity flexibility when optically coupling in a transmitter or transceiver.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T course wavelength division multiplexing (CWDM) or dense wavelength division multiplexing (DWDM) grid. As used herein, "mounted" refers to physically attaching two structures together, for example, by welding or using an epoxy or other substance or device for attachment. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly coupled" or "directly optically coupled" as used herein refers any optical connection that allows light to be imparted from one element to another without the use of an intermediate device such as a fiber.

Referring to FIG. 1, an optical transceiver 100, consistent with embodiments of the present disclosure, is shown and described. In this embodiment, the optical transceiver 100 transmits and receives four (4) channels using four different channel wavelengths ($\lambda_1$, $\lambda_2$, $\lambda_3$, $\lambda_4$) and may be configured for coarse wavelength division multiplexing (CWDM), although other numbers of channels are possible and within the scope of this disclosure. In one example, the channel wavelengths $\lambda_1$, $\lambda_2$, $\lambda_3$, $\lambda_4$ may be about 1270 nm, 1290 nm, 1310 nm, and 1330 nm, respectively. The optical transceiver 100 may be capable of transmission rates of at least about 25 Gbps per channel. The optical transceiver 100 may also be capable of both short transmission distances of tens of meters, for example, to distances of 2 kilometers or more. The optical transceiver 100 may be used, for example, in internet data center applications or fiber to the home (FTTH) applications.

In an embodiment, the optical transceiver 100 implements a Quad Small Form-Factor Plugging (QSFP) transceiver. For example, the optical transceiver 100 may be implemented within a QSFP receiver that comports with the "SFF Committee Specification SFF-8665 for QSFP+28 Gb/s 4× Pluggable Transceiver Solution (QSFP28)" published on May 10, 2013. The aspects and embodiments disclosed herein may be used within other transceiver types and is not necessarily limited to QSFP or QFSP+ transceivers.

The optical transceiver 100 includes a multi-channel transmitter optical subassembly (TOSA) 120 for transmitting optical signals on the channel wavelengths (e.g., $\lambda_1$, $\lambda_2$, $\lambda_3$, $\lambda_4$) and a multi-channel receiver optical subassembly (ROSA) 130 for receiving optical signals on the channel wavelengths (e.g., $\lambda_1$, $\lambda_2$, $\lambda_3$, $\lambda_4$). The multi-channel TOSA 120 and the multi-channel ROSA 130 are located in a transceiver housing 102. A transmit connecting circuit 104 and a receive connecting circuit 108 provide electrical connections to the multi-channel TOSA 120 and the multi-channel ROSA 130, respectively, within the housing 102. The transmit connecting circuit 104 is electrically connected to the electronic components (e.g., the lasers, monitor photodiodes, etc.) in the multi-channel TOSA 120 and the receive connecting circuit 108 is electrically connected to the electronic components (e.g., the photodiodes, the TIA, etc.) in the multi-channel ROSA 130. The transmit connecting circuit 104 and the receive connecting circuit 108 include at least conductive paths to provide electrical connections and may also include additional circuitry. The transmit connecting circuit 104 and the receive connecting circuit 108 may communicate with external systems via a data bus, such as a 38-pin connector that comports with physical connector QSFP standards and data communication protocols.

In this embodiment, the TOSA 120 includes a plurality of TOSA modules 124-1 to 124-4 optically coupled to an optical multiplexer 122 having mux input ports 126-1 to 126-4 and mux output port 128 on the same side, as described in greater detail below. The TOSA modules 124-1 to 124-4 may be coupled to the mux input ports 122-1 to 122-4 of the optical multiplexer 122 using optical fibers. The optical multiplexer 122 may be an arrayed waveguide grating (AWG) or a reversed PLC splitter. Although the optical multiplexer 122 is shown adjacent the TOSA modules 124-1 to 124-4 in this schematic diagram, the optical multiplexer 122 may be located at a distal end of the transceiver housing 102 away from the TOSA modules 124-1 to 124-4, as described in greater detail below. The TOSA modules 124-1 to 124-4 generate optical signals at different respective channel wavelengths (e.g., $\lambda_1$, $\lambda_2$, $\lambda_3$, $\lambda_4$) and the optical multiplexer 122 combines or multiplexes those optical signals to provide a multiplexed optical signal on the mux output port 128 coupled to an output optical fiber 115. The output optical fiber 115 is coupled to an output optical connector 116, such as an LC connector.

Each of the TOSA modules 124-1 to 124-4 may have a coaxial configuration such that the TOSA module is electrically connected at one end to conductive paths on the transmit connecting circuit 104 and optically coupled at the other end. Each of the TOSA modules 124-1 to 124-4 may include a laser for generating laser light at the assigned channel wavelength and optics for coupling the laser light into the respective mux input ports of the optical multiplexer 122. The lasers in the TOSA modules 124-1 to 124-4 thus convert electrical data signals (TX_D1 to TX_D4) received via the transmit connecting circuit 104 into modulated optical signals coupled into the optical multiplexer 122. The lasers may include, for example, distributed feedback (DFB) lasers with diffraction gratings. Each of the TOSA modules 124-1 to 124-4 may also include a monitor photodiode for monitoring the light emitted by the lasers. Each of the TOSA modules 124-1 to 124-4 may further include one or more temperature control devices, such as a resistive heater and/or a thermoelectric cooler (TEC), for controlling a temperature of the lasers, for example, to control or stabilize the laser wavelengths.

In this embodiment, the multi-channel ROSA 130 includes an optical demultiplexer 132 coupled to a photodetector array 134 including, for example, photodiodes. The optical demultiplexer 132 demultiplexes or separates a multiplexed optical signal received on an input optical fiber 117 to provide received optical signals at different channel wavelengths, which are detected by respective photodetectors in the photodetector array 134. The input optical fiber 117 is coupled to an input optical connector 118, such as an LC connector. The multi-channel ROSA 130 also includes a multi-channel transimpedance amplifier 136 electrically connected to the photodetector array 134. The photodetector array 134 and the transimpedance amplifier 136 detect and convert optical signals received from the optical demultiplexer 132 into electrical data signals (RX_D1 to RX_D4) that are output via the receive connecting circuit 108. Although one example of the multi-channel ROSA 130 is described, the optical transceivers 100 may include other types or embodiments of ROSAs. In other embodiments, a multi-channel optical transmitter may include the transmit circuit 104, multi-channel TOSA 120, and output optical connector 116 (i.e., the transmitting portion) without the receive circuit 108, multi-channel ROSA 130, and input optical connector 118 (i.e., the receiving portion).

Referring to FIGS. 2-7, a transmitting portion of one embodiment of a multi-channel optical transceiver 200 is shown and described in greater detail. The optical transceiver 200 includes a transceiver housing 202 that houses TOSA components and ROSA components (not shown). In this embodiment, an optical multiplexer 222 with mux input ports and an output port on one side is located at a distal end 202a of the transceiver housing 202. In the illustrated embodiment, the optical multiplexer 222 is abutting a distal wall 201 of the transceiver housing 202. In other embodiments, the optical multiplexer 222 may be adjacent the distal wall 201 without abutting the distal wall 201. The optical multiplexer 222 may be secured between structures 203 extending from the housing 202.

Figure 2:
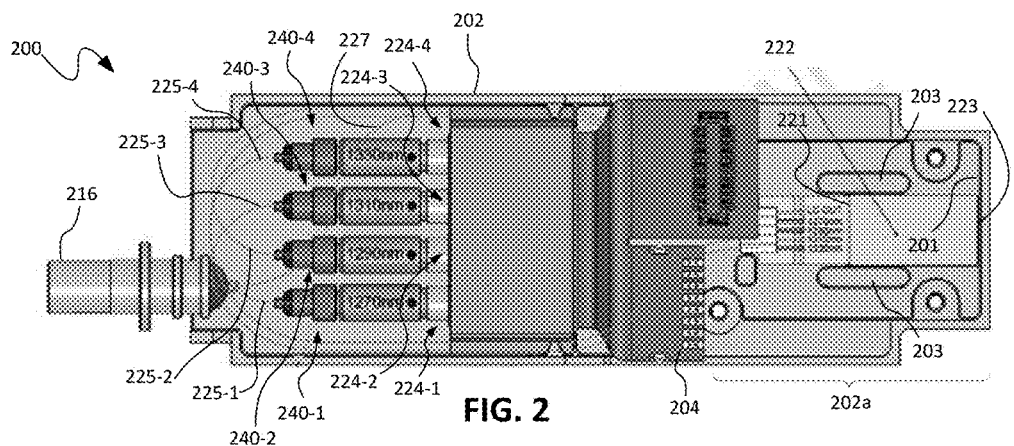
FIG. 2 is a top view of an embodiment of a transmitter portion of a multi-channel transceiver including an optical multiplexer with input and output ports on a single side, consistent with the present disclosure.
Figure 3:
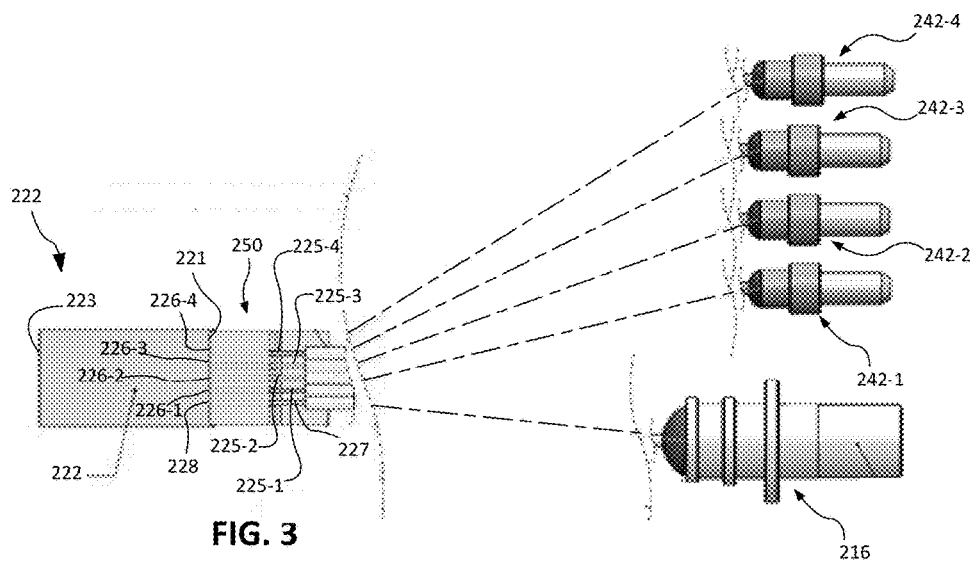
FIG. 3 is a top view of the optical multiplexer shown in FIG. 2 optically coupled to input optical fibers and an output optical fiber, consistent with the present disclosure.

As shown in greater detail in FIG. 3, the optical multiplexer 222 includes a plurality of mux input ports 226-1 to 226-4 and a mux output port 228 all on the same side 221 (herein referred to as the optical coupling side). As shown in FIG. 2, the distal side 223 of the optical multiplexer 222 (i.e., opposite the optical coupling side 221) is adjacent to or abutting the distal wall 201 of the transceiver housing 202 and the optical coupling side 221 is directed toward the other TOSA components in the transceiver housing 202. This arrangement facilitates optical coupling with the optical multiplexer 222 using optical fibers 225-1 to 225-4, 227 without unnecessary bends in the optical fibers.

The optical multiplexer 222 may be an arrayed waveguide grating (AWG) with the input ports and output port on the same side or facet of the AWG chip. The optical multiplexer 222 may also be a reversed planar lightwave circuit (PLC) splitter with a splitter input port (used as mux output port) and splitter output ports (used as mux input ports) on the same side or facet of the PLC splitter chip. One example of a reversed PLC splitter used as an optical multiplexer is described in greater detail in U.S. Patent Application Publication No. 2017-0359126A1 (Ser. No. 15/176,404), which is commonly owned and incorporated herein by reference. The reversed PLC splitter has the additional advantage of being wavelength independent and thus may be less susceptible to wavelength drift (e.g., caused by temperature changes).

Figure 4:
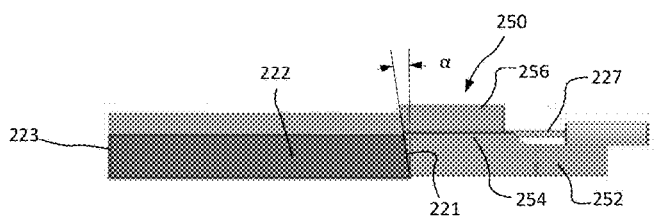
FIG. 4 is a side view of the optical multiplexer shown in FIG. 3.
Figure 6:
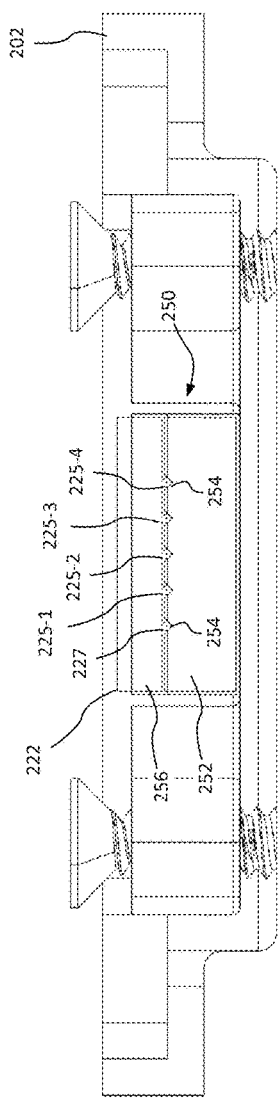
FIG. 6 is a cross-sectional view of the multi-channel transceiver taken along line 6-6 in FIG. 5 showing of the fiber array holder.

As shown in greater detail in FIGS. 4 and 6, a fiber array holder 250 is used to hold input optical fibers 225-1 to 225-4 and output optical fiber 227 in alignment with and optically coupled to the respective mux input ports 226-1 to 226-4 and the mux output port 228 on the optical coupling side 221 of the optical multiplexer 222. In this embodiment, the fiber array holder 250 includes a base portion 252 with V-shaped grooves 254 receiving the respective optical fibers and a top portion 256 securing the fibers in the V-shaped grooves 254. The coupling side 221 may be angled with an angle α relative to a line perpendicular to the top and/or bottom surface of the optical multiplexer 222. The fiber array holder 250 has a corresponding angled coupling face to allow angled fiber ends to be coupled to angled mux input ports, which reduces back reflection and improves coupling efficiency. In one example, the length of the optical multiplexer 222 with the fiber array holder 250 may be less than 15 mm and more specifically about 12.2 mm. and the width of the optical multiplexer 222 may be less than 5 mm and more specifically about 4.0 mm.

Figure 5:
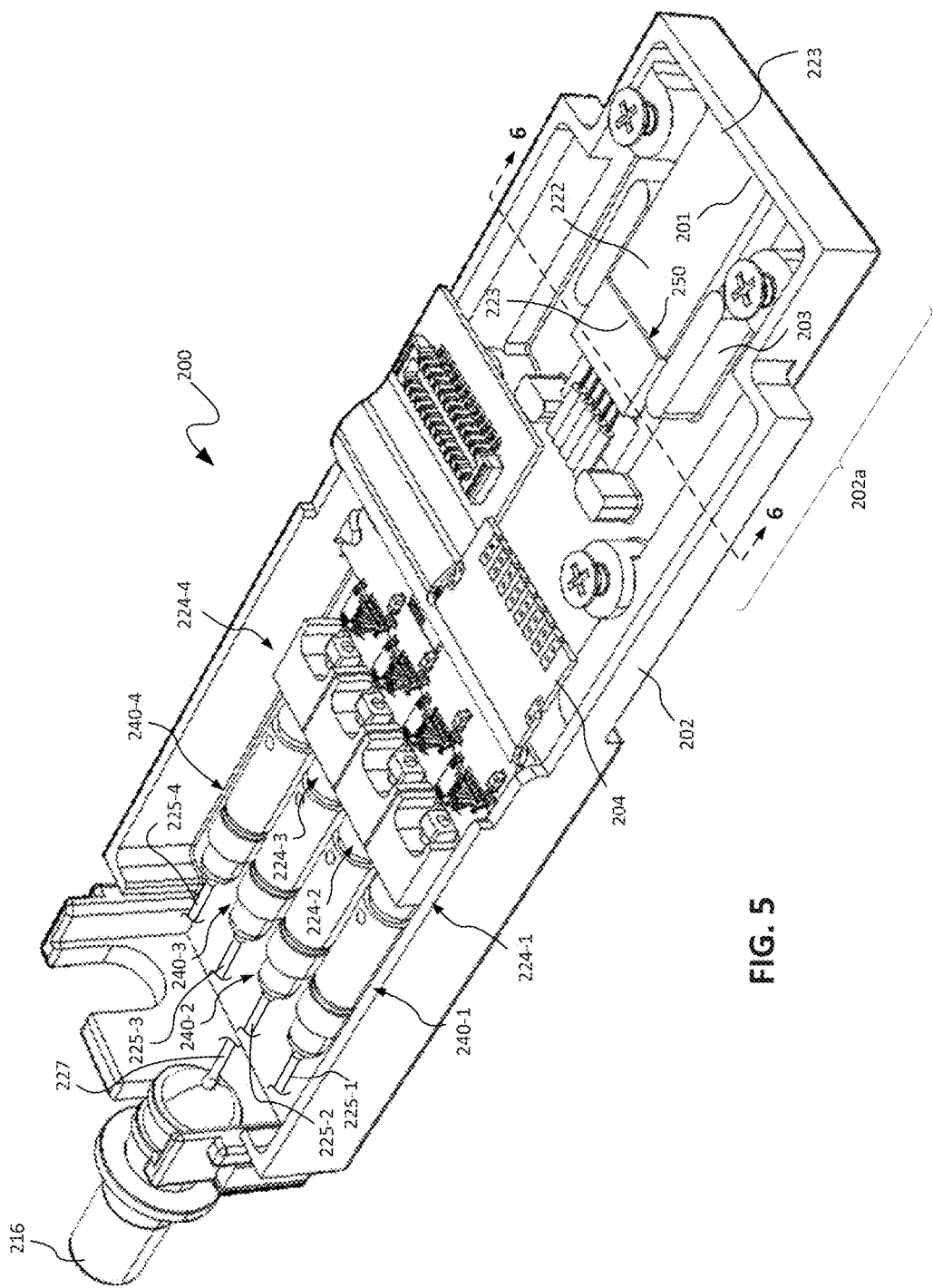
FIG. 5 is a perspective view of the multi-channel transceiver in FIG. 2 showing the TOSA modules.

The mux input optical fibers 225-1 to 225-4 are optically coupled to a plurality of TOSA modules 224-1 to 224-4 using TOSA optical coupling assemblies 240-1 to 240-4, as shown in greater detail in FIG. 5. The TOSA modules 224-1 to 224-4 are located in another section of the housing 202 such that the optical multiplexer 222 is spaced from the TOSA modules 224-1 to 224-4 to reduce thermal effects from the heat generated by the TOSA modules 224-1 to 224-4. The TOSA optical coupling assemblies 240-1 to 240-4 may include one or more optical coupling ferrules 242-1 to 242-4 (see FIG. 3), which are inserted into coupling receptacles extending from the TOSA modules 224-1 to 224-4 to provide optical alignment and coupling. Known optical coupling assemblies may be used such as LC/UPC coupling ferrules. The mux output port 228 of the optical multiplexer 222 is optically coupled to an output optical connector 216 using the output optical fiber 227 (see FIG. 2). The output optical connector 216 may be a known optical connector such as an LC receptacle.

Figure 8:
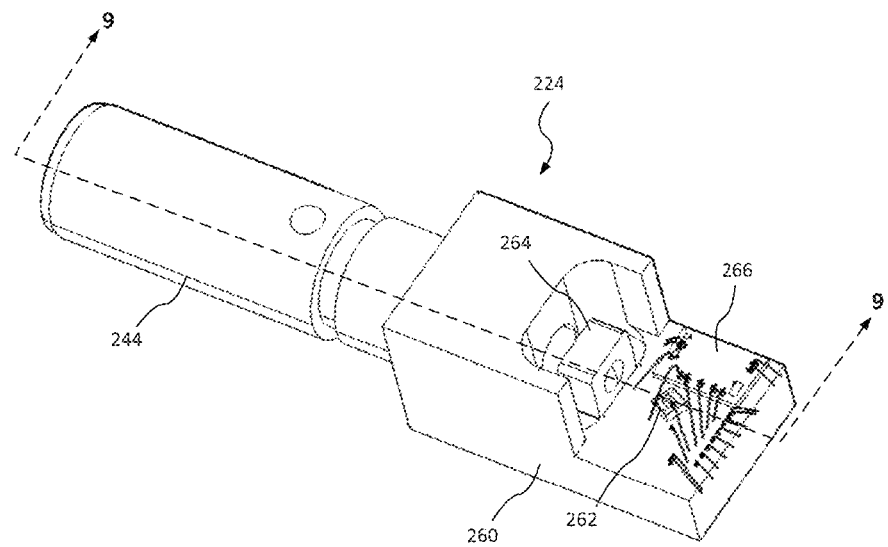
FIG. 8 is a perspective view of a TOSA module used in the multi-channel transceiver shown in FIG. 5.
Figure 9:
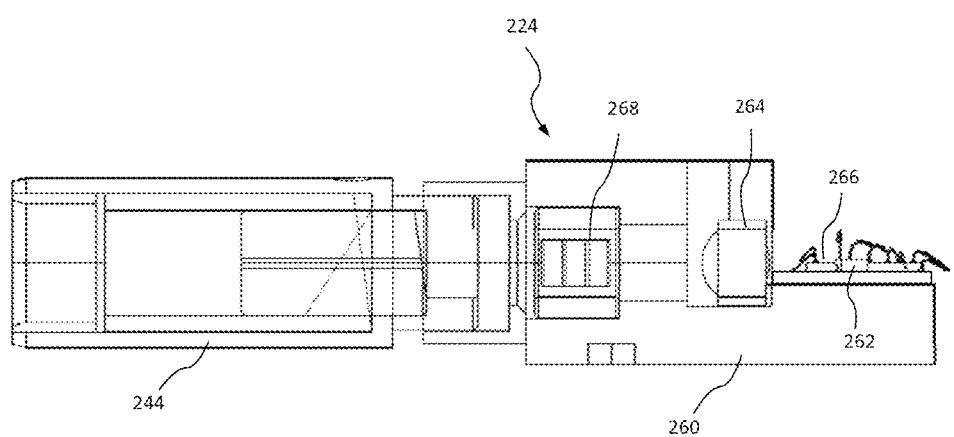
FIG. 9 is a side cross-sectional view of the TOSA module in FIG. 8 taken along line 9-9.

As shown in greater detail in FIGS. 8 and 9, each TOSA module 224 includes a TOSA base 260 with an optical coupling end for optically coupling to the optical fibers and an electrical coupling end for electrically connecting to a transmit connect circuit. An optical coupling receptacle 244 extends from the optical coupling end of the TOSA base 260 for receiving an optical coupling ferrule (e.g., ferrules 242-1 to 242-4 shown in FIG. 3) at the end of a mux input optical fiber. The TOSA base 260 supports a laser 262 and a lens 264 for focusing the laser light into the optical coupling receptacle 244 for optical coupling into the coupled optical fiber. The illustrated embodiment of the TOSA module 224 also includes an optical isolator 268 located in the optical coupling end of the TOSA base 260. The TOSA module 224 may further include other optical and/or electrical components including, without limitation, filters, monitor photodiodes, thermoelectric coolers, and laser drive circuitry. Although one embodiment of a TOSA module is shown and described, an optical multiplexer with mux input ports and a mux output port on the same side may be optically coupled to TOSA modules having other configurations.

Figure 7:
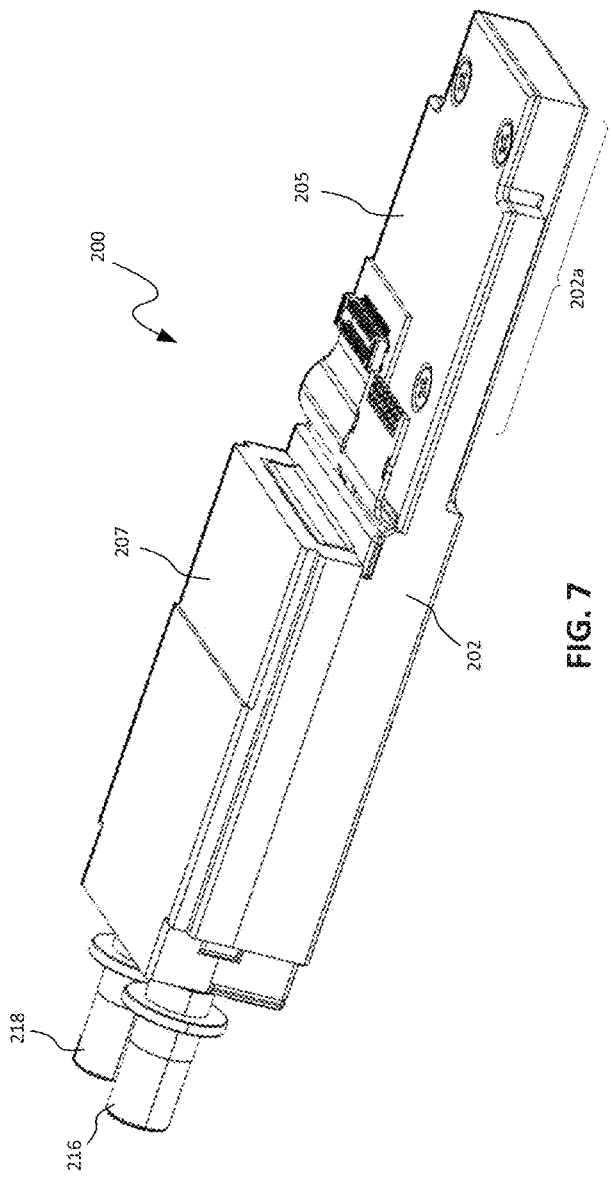
FIG. 7 is a top perspective view of the multi-channel transceiver covered by a top portion of the housing.

FIG. 7 shows the multi-channel optical transceiver 200 enclosed by the housing 202 and cover portions 205, 207. In the illustrated embodiment, one cover portion 205 covers the distal end 202a of the housing 202 including the optical multiplexer and another cover portion 207 covers the other portion of the housing 202 including the TOSA modules. The transceiver 200 may also include ROSA components (not shown), such as an optical demultiplexer, a photodiode array, and a transimpedance amplifier, enclosed within the transceiver housing 202 and cover portion 207. The transceiver 200 includes an input optical connector 218 adjacent the output optical connector 216 at one end of the transceiver housing 202 for optically coupling to the ROSA components within the transceiver housing 202 using a receive input optical fiber (not shown). In other embodiments, a transmitter may include a transmitter housing with the optical multiplexer 222, TOSA modules 224-1 to 224-4, optical fibers 225-1 to 225-4, 227 and TOSA optical coupling assemblies 240-1 to 240-4 and without ROSA components.

Figure 10:
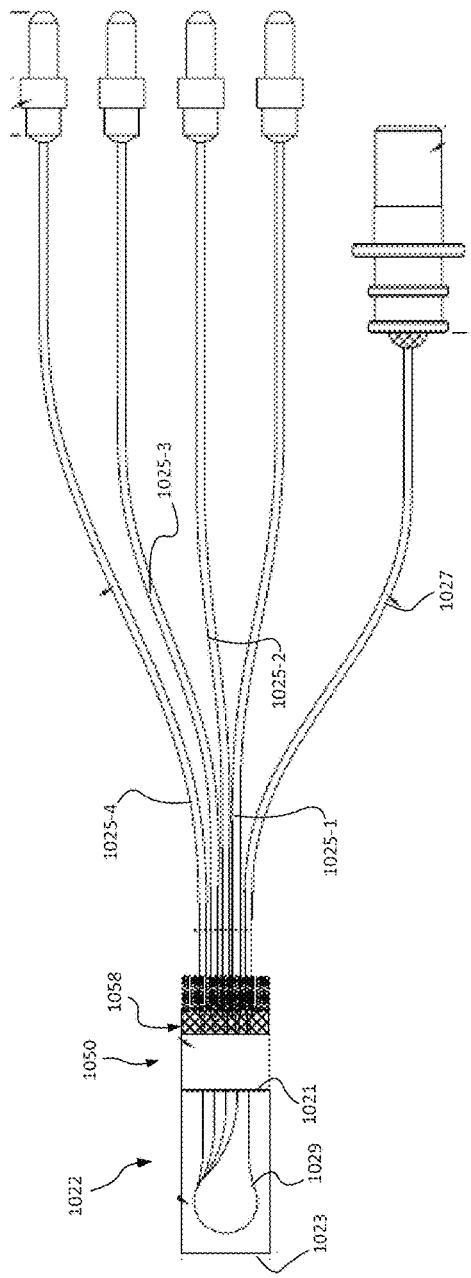
FIG. 10 is top view of another embodiment of an optical multiplexer with input and output ports on a single side and with generally U-shaped waveguides, consistent with the present disclosure.
Figure 11:
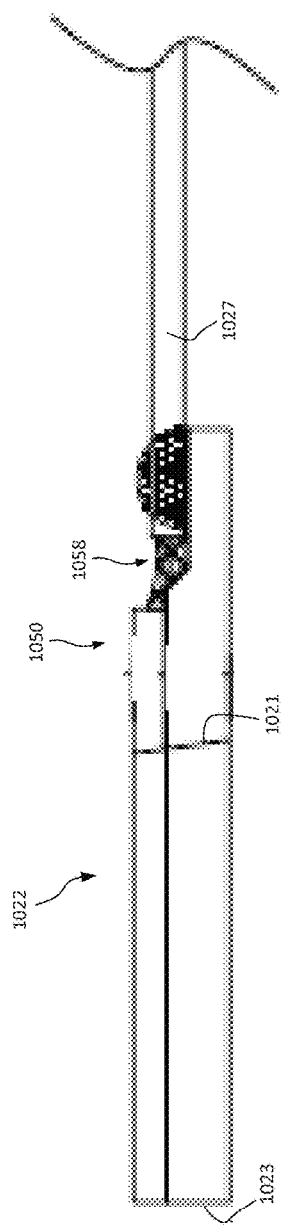
FIG. 11 is a side view of the optical multiplexer shown in FIG. 10.

FIGS. 10 and 11 illustrate an optical multiplexer 1022, consistent with another embodiment, having waveguides 1029 forming a generally U-shaped pattern. The U-shaped waveguides 1029 extend from the optical coupling side 1021 and turn 180 degrees back to the same optical coupling side 1021 such that the mux input ports and the mux output port are located on the same optical coupling side 1021. Where the optical multiplexer 1022 is an AWG, the waveguides in the AWG may form the generally U-shaped pattern. Where the optical multiplexer 1022 is a reversed PLC splitter, the branched waveguides in the PLC splitter form the generally U-shaped pattern.

A fiber array holder 1050 provides alignment and optical coupling between the input optical fibers 1025-1 to 1025-4 and the output optical fiber 1027 and the respective mux input ports and mux output port on the optical coupling side 1021 of the optical multiplexer 1022. As shown in this illustrated embodiment, an adhesive 1058 may be used to secure the optical fibers 1025-1 to 1025-4, 1027 to the fiber array holder 1050. The opposite, distal side 1023 of the optical multiplexer 1022 may be positioned adjacent to or abutting a distal wall in a transceiver or transmitter housing, as described above.

Accordingly, an optical multiplexer with a plurality of mux input ports and a mux output port on one side, consistent with embodiments disclosed herein, may be used in a multi-channel optical transceiver or transmitter to reduce the length of the transceiver or transmitter while also reducing the adverse impact of heat on the multiplexer.

Consistent with an embodiment, a multi-channel optical transceiver includes a transceiver housing and a plurality of transmitter optical subassembly (TOSA) modules located in the transceiver housing for transmitting a plurality of optical signals at different respective channel wavelengths. The multi-channel transceiver also includes an optical multiplexer located at a distal end of the transceiver housing and optically coupled to the TOSA modules for multiplexing the plurality of optical signals into a multiplexed optical signal including the different channel wavelengths. The optical multiplexer includes a plurality of mux input ports optically coupled to the respective TOSA modules with input optical fibers for receiving the respective optical signals and a mux output port optically coupled to an output optical fiber for outputting the multiplexed optical signal. The mux input ports and the mux output port are located on one side of the optical multiplexer facing away from the distal end of the transceiver housing. The multi-channel transceiver further includes a multi-channel receiver optical subassembly (ROSA) located in the transceiver housing for receiving a multiplexed optical signal including multiple channel wavelengths, separating the channel wavelengths, and detecting optical signals at each of the channel wavelengths.

Consistent with another embodiment, a multi-channel optical transmitter includes a transmitter housing and a plurality of transmitter optical subassembly (TOSA) modules located in the transmitter housing for transmitting a plurality of optical signals at different respective channel wavelengths. The multi-channel transmitter also includes an optical multiplexer located at a distal end of the transmitter housing and optically coupled to the TOSA modules for multiplexing the plurality of optical signals into a multiplexed optical signal including the different channel wavelengths. The optical multiplexer includes a plurality of mux input ports optically coupled to the respective TOSA modules with input optical fibers for receiving the respective optical signals and a mux output port optically coupled to an output optical fiber for outputting the multiplexed optical signal. The mux input ports and the mux output port are located on one side of the optical multiplexer facing away from the distal end of the transmitter housing.

Consistent with a further embodiment, a multi-channel optical transceiver includes a transceiver housing and a plurality of transmitter optical subassembly (TOSA) modules located in the transceiver housing for transmitting a plurality of optical signals at different respective channel wavelengths. The multi-channel optical transceiver also includes an optical multiplexer located in the transceiver housing and optically coupled to the TOSA modules for multiplexing the plurality of optical signals into a multiplexed optical signal including the different channel wavelengths. The optical multiplexer includes a plurality of mux input ports optically coupled to the respective TOSAs with input optical fibers for receiving the respective optical signals and a mux output port optically coupled to an output optical fiber for outputting the multiplexed optical signal. The mux input ports and the mux output port are located on one side of the optical multiplexer. The optical multiplexer includes a reversed planar lightwave circuit (PLC) splitter including a plurality of splitter output ports used as the mux input ports, a splitter input port used as the mux output port, and branched waveguides configured to combine the optical signals into the multiplexed optical signal. The multi-channel optical transceiver further includes a multi-channel receiver optical subassembly (ROSA) for receiving a multiplexed optical signal including multiple channel wavelengths, separating the channel wavelengths, and detecting optical signals at each of the channel wavelengths.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:
1. A multi-channel optical transceiver comprising:
   a transceiver housing;
   a plurality of transmitter optical subassembly (TOSA) modules located in the transceiver housing for transmitting a plurality of optical signals at different respective channel wavelengths;
   an optical multiplexer located at a distal end of the transceiver housing and optically coupled to the TOSA modules for multiplexing the plurality of optical signals into a multiplexed optical signal including the different channel wavelengths, wherein the optical multiplexer includes a plurality of mux input ports optically coupled to the respective TOSA modules with input optical fibers for receiving the respective optical signals and a mux output port optically coupled to an output optical fiber for outputting the multiplexed optical signal, and wherein the mux input ports and the mux output port are located on one side of the optical multiplexer facing away from the distal end of the transceiver housing; and a multi-channel receiver optical subassembly (ROSA) located in the transceiver housing for receiving a multiplexed optical signal including multiple channel wavelengths, separating the channel wavelengths, and detecting optical signals at each of the channel wavelengths.

2. The multi-channel optical transceiver of claim 1 wherein the optical multiplexer includes a reversed planar lightwave circuit (PLC) splitter including a plurality of splitter output ports used as the mux input ports, a splitter input port used as the mux output port and branched waveguides configured to combine the optical signals into the multiplexed optical signal.

3. The multi-channel optical transceiver of claim 2, wherein the TOSA modules include optical isolators for isolating the optical signals received on the mux input ports.

4. The multi-channel optical transceiver of claim 2, wherein the PLC splitter is a 1:4 splitter providing 4 mux input ports and 1 mux output port.

5. The multi-channel optical transceiver of claim 2, wherein the TOSA modules include four (4) TOSA modules each configured to transmit an optical signal at a transmission rate of at least about 25 Gbps, and wherein the PLC splitter is a 1:4 splitter providing 4 mux input ports and 1 mux output port.

6. The multi-channel optical transceiver of claim 1, wherein the optical multiplexer includes an arrayed waveguide grating (AWG).

7. The multi-channel optical transceiver of claim 1, wherein the optical multiplexer includes waveguides extending between the mux inputs and the mux output with a generally U-shaped pattern.

8. The multi-channel optical transceiver of claim 1, wherein the optical multiplexer abuts a distal end wall of the transceiver housing.

9. The multi-channel optical transceiver of claim 1, wherein each of the TOSA modules include a TOSA base, a laser diode supported on the base, laser driving circuitry for driving the laser diode, and a lens aligned with the laser diode for optically coupling laser light.

10. The multi-channel optical transceiver of claim 1, wherein the transceiver is a Small Form-factor Pluggable (SFP) transceiver module.

11. The multi-channel optical transceiver of claim 1, further including a fiber array holder holding the input optical fibers and the output optical fiber in alignment with the mux input ports and the mux output port, respectively.

12. The multi-channel optical transceiver of claim 1, wherein the optical input fibers and the optical output fiber are directly coupled to the mux input ports and the mux output port, respectively.

13. The multi-channel optical transceiver of claim 1, wherein the channel wavelengths include wavelengths of about 1270 nm, 1290 nm, 1310 nm, and 1330 nm.

14. A multi-channel optical transmitter comprising:
a transmitter housing;
a plurality of transmitter optical subassembly (TOSA) modules located in the transmitter housing for transmitting a plurality of optical signals at different respective channel wavelengths; and
an optical multiplexer located at a distal end of the transmitter housing and optically coupled to the TOSA modules for multiplexing the plurality of optical signals into a multiplexed optical signal including the different channel wavelengths, wherein the optical multiplexer includes a plurality of mux input ports optically coupled to the respective TOSA modules with input optical fibers for receiving the respective optical signals and a mux output port optically coupled to an output optical fiber for outputting the multiplexed optical signal, and wherein the mux input ports and the mux output port are located on one side of the optical multiplexer facing away from the distal end of the transmitter housing.

15. The multi-channel optical transmitter of claim 14, wherein the optical multiplexer includes a reversed planar lightwave circuit (PLC) splitter including a plurality of splitter output ports used as the mux input ports, a splitter input port used as the mux output port and branched waveguides configured to combine the optical signals into the multiplexed optical signal.

16. The multi-channel optical transmitter of claim 14, wherein the optical multiplexer includes waveguides extending between the mux inputs and the mux output with a generally U-shaped pattern.

17. A multi-channel optical transceiver comprising:
a transceiver housing;
a plurality of transmitter optical subassembly (TOSA) modules located in the transceiver housing for transmitting a plurality of optical signals at different respective channel wavelengths;
an optical multiplexer located in the transceiver housing and optically coupled to the TOSA modules for multiplexing the plurality of optical signals into a multiplexed optical signal including the different channel wavelengths, wherein the optical multiplexer includes a plurality of mux input ports optically coupled to the respective TOSAs with input optical fibers for receiving the respective optical signals and a mux output port optically coupled to an output optical fiber for outputting the multiplexed optical signal, and wherein the mux input ports and the mux output port are located on one side of the optical multiplexer, wherein the optical multiplexer includes a reversed planar lightwave circuit (PLC) splitter including a plurality of splitter output ports used as the mux input ports, a splitter input port used as the mux output port and branched waveguides configured to combine the optical signals into the multiplexed optical signal; and
a multi-channel receiver optical subassembly (ROSA) for receiving a multiplexed optical signal including multiple channel wavelengths, separating the channel wavelengths, and detecting optical signals at each of the channel wavelengths.

18. The multi-channel optical transceiver of claim 17, wherein the optical multiplexer includes waveguides extending between the mux inputs and the mux output with a generally U-shaped pattern.

19. The multi-channel optical transceiver of claim 17, wherein the PLC splitter is a 1:4 splitter providing 4 mux input ports and 1 mux output port.

20. The multi-channel optical transceiver of claim 17, wherein each of the TOSA modules include a TOSA base, a laser diode supported on the base, laser driving circuitry for driving the laser diode, a lens aligned with the laser diode for optically coupling laser light and an isolator aligned with the lens for isolating the light.

* * * * *